(12) United States Patent
Cross et al.

(10) Patent No.: US 12,203,370 B2
(45) Date of Patent: Jan. 21, 2025

(54) TUNNELING DEVICE INCLUDING EXPANDABLE SECTION

(71) Applicant: General Electric Company, Schenectady, NY (US)

(72) Inventors: Andrew Thomas Cross, Waterford, NY (US); Christopher Walter Falcone, Schenectady, NY (US); Deepak Trivedi, Halfmoon, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 79 days.

(21) Appl. No.: 17/981,940

(22) Filed: Nov. 7, 2022

(65) Prior Publication Data
US 2024/0151110 A1    May 9, 2024

(51) Int. Cl.
*E21B 7/26* (2006.01)
*E21B 10/32* (2006.01)

(52) U.S. Cl.
CPC .............. *E21B 7/26* (2013.01); *E21B 10/322* (2013.01)

(58) Field of Classification Search
CPC .......... E21B 7/26; E21B 10/322; E21B 10/32; E21B 7/061
See application file for complete search history.

(56) References Cited

U.S. PATENT DOCUMENTS

| | | |
|---|---|---|
| 3,525,111 A | 8/1970 | Von Arx |
| 4,475,260 A | 10/1984 | Beck |
| 5,423,630 A | 6/1995 | Imoto et al. |
| 6,107,795 A | 8/2000 | Smart |
| 6,349,746 B1 | 2/2002 | Bergemann et al. |
| 6,371,631 B1 | 4/2002 | Reutemann |
| 6,514,346 B1 | 2/2003 | Nichols |
| 6,959,772 B2 | 11/2005 | Stegmaier et al. |

(Continued)

FOREIGN PATENT DOCUMENTS

| | | |
|---|---|---|
| DE | 102005008017 A1 | 8/2006 |
| DE | 102005052038 A1 | 5/2007 |

(Continued)

OTHER PUBLICATIONS

Cameran, Italian Patent No. IT 2019/00001861 A1, English Translation date Sep. 16, 2024. (Year: 2019).*

(Continued)

*Primary Examiner* — Caroline N Butcher
(74) *Attorney, Agent, or Firm* — Armstrong Teasdale LLP

(57) ABSTRACT

A tunneling device includes a body assembly, an expander coupled to the body assembly and extending along a longitudinal axis, and a tip coupled to the expander. The expander is disposed between a force transmitter and the tip. The expander is expandable in a direction perpendicular to the longitudinal axis between a first configuration having a first width measured perpendicular to the longitudinal axis and a second configuration having a second width measured perpendicular to the longitudinal axis. The tip has a width measured perpendicular to the longitudinal axis. The first width of the expander is equal to or less than the width of the tip. The force transmitter is configured to deliver a force through the expander to the tip to move the tip in a direction parallel to the longitudinal axis with the expander in the second configuration.

21 Claims, 5 Drawing Sheets

(56) References Cited

U.S. PATENT DOCUMENTS

| | | |
|---|---|---|
| 7,210,364 B2 | 5/2007 | Ghorbel et al. |
| 7,812,328 B2 | 10/2010 | Betz |
| 10,343,272 B2 | 7/2019 | Morita et al. |
| 2003/0039752 A1 | 2/2003 | Winiewicz et al. |
| 2004/0123732 A1 | 7/2004 | Lindsay |
| 2004/0226747 A1* | 11/2004 | Stegmaier ............... E21B 7/067 |
| | | 175/73 |
| 2011/0036507 A1* | 2/2011 | Corghi ................ B60C 25/0593 |
| | | 29/426.6 |
| 2012/0292049 A1* | 11/2012 | Heijnen .................. E21B 23/14 |
| | | 166/381 |
| 2021/0025533 A1 | 1/2021 | Duncan et al. |
| 2021/0025534 A1 | 1/2021 | Duncan et al. |
| 2021/0025535 A1 | 1/2021 | Duncan et al. |
| 2021/0025536 A1 | 1/2021 | Duncan et al. |

FOREIGN PATENT DOCUMENTS

| | | | |
|---|---|---|---|
| IT | 201900001861 A1 * | 8/2019 | |
| WO | 2009003790 A1 | 1/2009 | |

OTHER PUBLICATIONS

Lightner et al., "The Fluidic Muscle: A 'New' Development", Journal of Modern Engineering, 2002, 2(2).

* cited by examiner

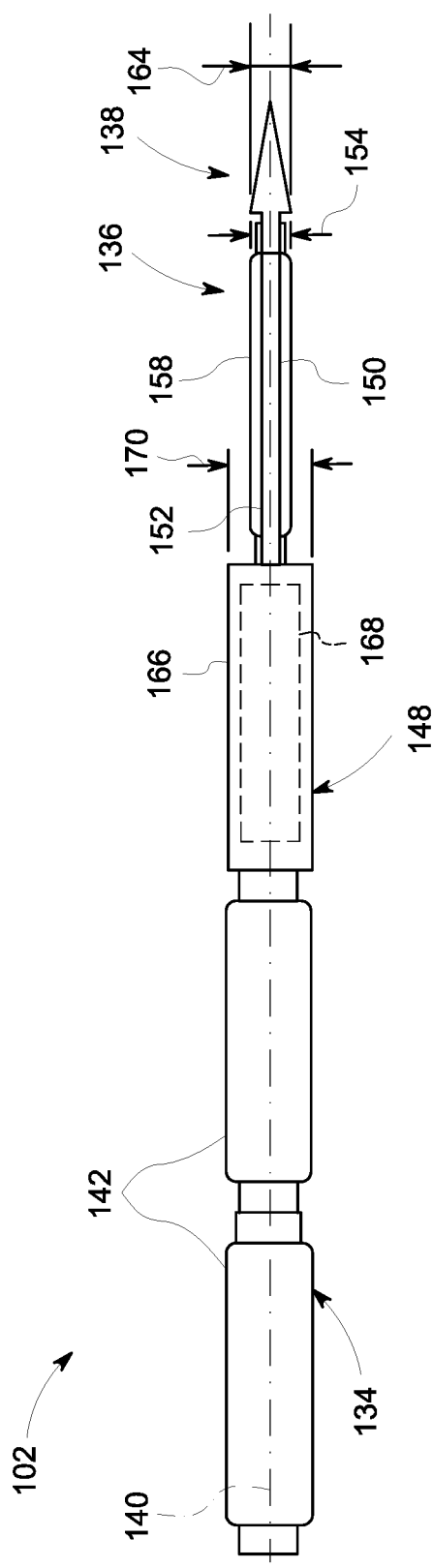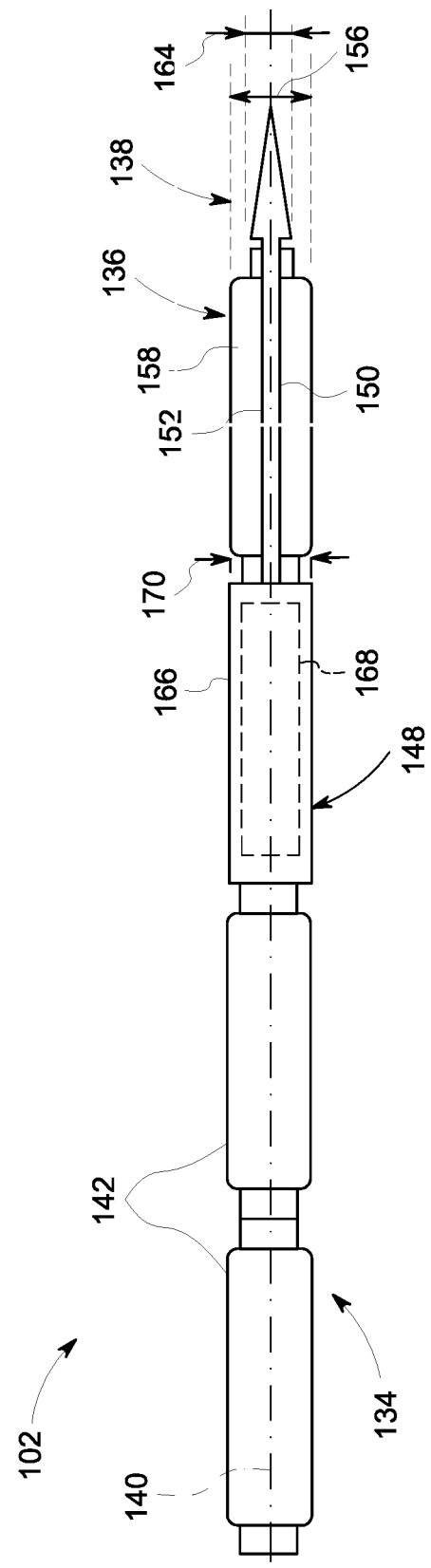
FIG. 2
FIG. 3

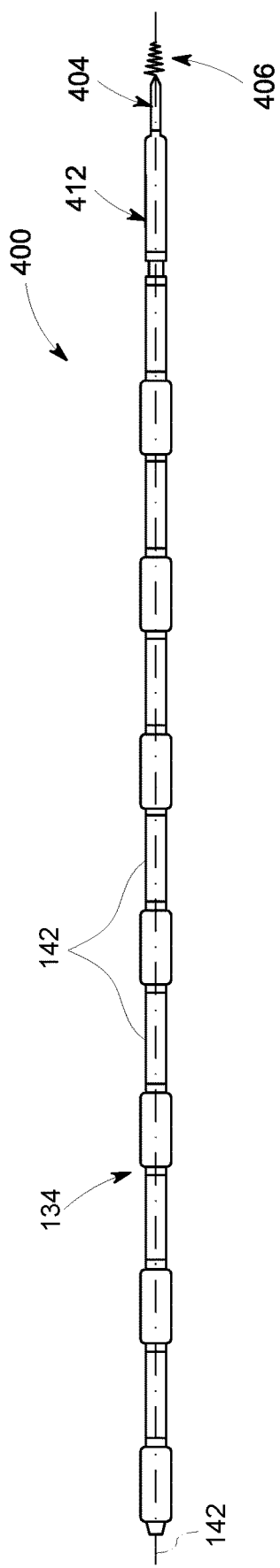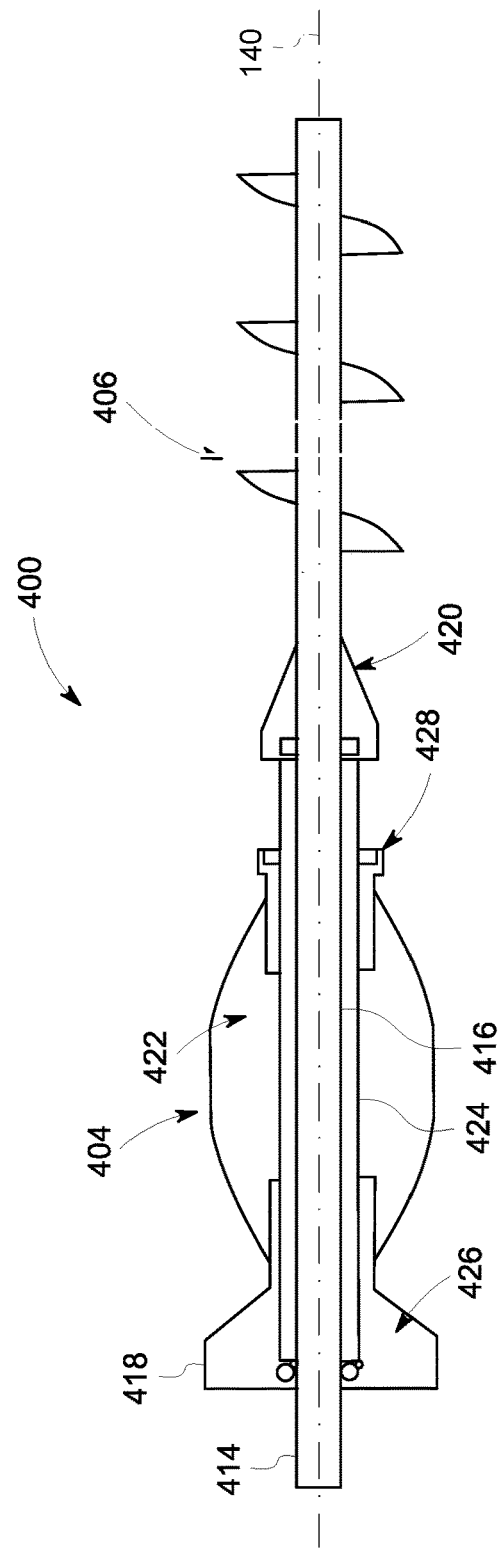

TUNNELING DEVICE INCLUDING EXPANDABLE SECTION

STATEMENT REGARDING FEDERALLY SPONSORED RESEARCH AND DEVELOPMENT

This invention was made with Government support under contract number D19AC00018 awarded by the Defense Advanced Research Projects Agency (DARPA). The Government has certain rights in this invention.

BACKGROUND

The field of the disclosure relates to tunneling devices, and more particularly to tunneling devices including a body assembly and one or more expandable sections.

Tunneling devices are used to travel through underground locations and displace material to form and shape tunnels through the underground locations. At least some tunneling devices include a drive system to propel the tunneling devices through underground locations. In addition, a tool may be positioned at the front of the tunneling devices to displace material and form an interior cavity of the tunnel as the tunneling devices travel through the underground locations. However, the underground locations may have varying conditions and obstacles that make travel and access difficult. In addition, the size, shape, and power requirements of the tunneling device are at least partly dictated by the configuration of the tool used to displace material, the drive system, and environmental characteristics. Also, at least some known tools are not able to efficiently use the power provided by on an onboard power system to displace material and do not precisely remove material to shape the tunnel. Moreover, a separate apparatus is typically required to remove the displaced material from the tunnel.

Accordingly, it is desirable to provide a system including a tunneling device configured to travel through difficult to access locations and efficiently displace material.

BRIEF DESCRIPTION

In one aspect, a tunneling device includes a body assembly, an expander coupled to the body assembly and extending along a longitudinal axis, a tip coupled to the expander, and a force transmitter. The expander is expandable in a direction perpendicular to the longitudinal axis between a first configuration having a first width measured perpendicular to the longitudinal axis and a second configuration having a second width measured perpendicular to the longitudinal axis. The tip has a width measured perpendicular to the longitudinal axis. The first width of the expander is equal to or less than the width of the tip. The second width of the expander is greater than the width of the tip. The force transmitter is coupled to the expander. The expander is disposed between the force transmitter and the tip. The force transmitter is configured to deliver a force through the expander to the tip to move the tip in a direction parallel to the longitudinal axis with the expander in the second configuration. The force transmitter has a width measured perpendicular to the longitudinal axis. The second width of the expander is equal to or greater than the width of the force transmitter.

In another aspect, a system for use in maintaining a tunnel is provided. The system includes a tunneling device and a controller communicatively coupled to the tunneling device. The tunneling device includes a body assembly including a force transmitter, an expander coupled to the body assembly and extending along a longitudinal axis, and a tip coupled to the expander and configured to move relative to the expander. The expander is disposed between the force transmitter and the tip. The expander is expandable in a direction perpendicular to the longitudinal axis between a first configuration having a first width measured perpendicular to the longitudinal axis and a second configuration having a second width measured perpendicular to the longitudinal axis. The tip has a width measured perpendicular to the longitudinal axis. The first width of the expander is equal to or less than the width of the tip. The controller is configured to provide instructions to move the body assembly.

In yet another aspect, a method for maintaining a tunnel having a sidewall defining an interior cavity is provided. The method includes moving a tunneling device through an underground location. The tunneling device includes a body assembly, an expander coupled to the body assembly and extending along a longitudinal axis, and a tip coupled to the expander and configured to move relative to the expander. The body assembly includes a plurality of sections and a force transmitter. The expander is disposed between the force transmitter and the tip. The expander is expandable in a direction perpendicular to the longitudinal axis between a first configuration having a first width measured perpendicular to the longitudinal axis and a second configuration having a second width measured perpendicular to the longitudinal axis. The tip has a width measured perpendicular to the longitudinal axis. The first width of the expander is equal to or less than the width of the tip. The method also includes switching the expander between the first configuration and the second configuration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a side view of a portion of the tunneling device shown in FIG. 1 illustrating an expander of the tunneling device in a first configuration;

FIG. 3 is a side view of a portion of the tunneling device shown in FIG. 1 illustrating the expander of the tunneling device in a second configuration;

FIG. 7 is a side view of another alternative embodiment of a tunneling device for use with the system shown in FIG. 1, the tunneling device having a distal end including an auger; and FIG. 8 is an enlarged view of a portion of the tunneling device of FIG. 7.

Figure 1:
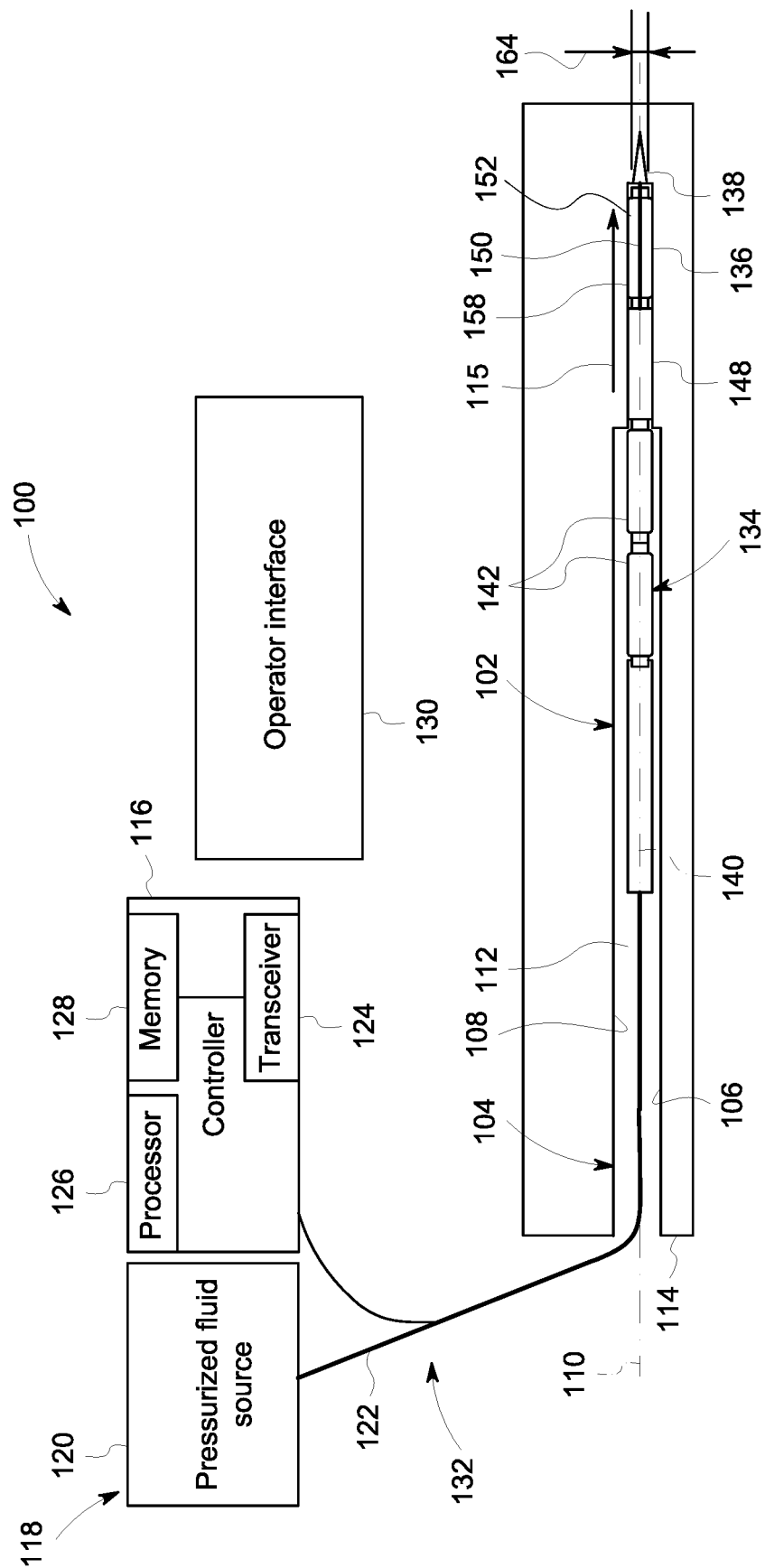
FIG. 1 is a schematic diagram of a system including one embodiment of a tunneling device traveling underground.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system including a tunneling device. The tunneling device includes a body assembly, an expander coupled to the body assembly and extending along a longitudinal axis, and a tip coupled to the expander. The expander is expandable in a direction perpendicular to the longitudinal axis between a first configuration having a first width measured perpendicular to the longitudinal axis, and a second configuration having a second width measured perpendicular to the longitudinal axis. The first width of the expander is equal to or less than a width of the tip, and the second width of the expander is greater than the width of the tip. The expander facilitates the tunneling device traveling an underground location and performing a tunneling operation or a maintenance operation for a tunnel. For example, the tip may include a tunnelling tool configured to displace material and form a tunnel. The expander is configured to fit into the tunnel formed by the tip when the expander is in the first configuration, and the expander is configured to engage a sidewall of the tunnel and resist radial movement of the tip when the expander is in the second configuration. In addition, the expander may engage and compact material in a sidewall of the tunnel when the expander switches between the first configuration and the second configuration.

FIG. 1 is a schematic diagram of a system 100 including a tunneling device 102 traveling underground. For example, the tunneling device 102 is configured to travel through a tunnel 104 and/or displace material to form tunnel 104. Tunnel 104 includes a sidewall 106 having an interior surface 108 extending around a central axis 110 and defining interior cavity 112. Tunneling device 102 is configured to fit within interior cavity 112 and travel along the length of tunnel 104. Accordingly, tunneling device 102 facilitates construction of tunnel 104 and/or inspection and repair of tunnel 104. Moreover, tunneling device 102 is self-propelled, meaning that tunneling device 102 moves within interior cavity 112 without an external force acting on tunneling device 102.

During operation, for example, tunneling device 102 may be positioned at a surface 114 proximate an underground location and tunneling device 102 travels through surface 114 to form an opening into tunnel 104. In the illustrated embodiment, tunneling device 102 travels in a travel direction 115. In some embodiments, tunneling device 102 traverses transitions in tunnel 104 such as bends or size transitions. As tunneling device 102 travels through underground locations, tunneling device 102 is configured to form tunnel 104 and/or inspect and/or repair any portions of tunnel 104.

System 100 includes tunneling device 102, a controller 116 communicatively coupled to tunneling device 102, and a fluid supply system 118. Fluid supply system 118 includes a pressurized fluid source 120 that is coupled to tunneling device 102 via a fluid line 122. Fluid supply system 118 is configured to regulate pressurized fluid that is delivered to/removed from tunneling device 102 for operation of tunneling device 102, as described further herein.

In addition, in the example embodiment, controller 116 is configured to provide instructions to move tunneling device 102 through tunnel 104 and/or to perform inspection or repair operations. Controller 116 includes a transceiver 124, a processor 126, and a memory 128. In some embodiments, controller 116 is positioned remotely from tunneling device 102, e.g., controller 116 is located at a base station that enables an operator on an exterior of tunnel 104 (shown in FIG. 1) to interact with tunneling device 102, and/or controller 116 can be at least partly incorporated into and located on board tunneling device 102. Transceiver 124 is communicatively coupled with tunneling device 102 and is configured to send information to and receive information from a transceiver of tunneling device 102. In some embodiments, transceiver 124 and a transceiver on tunneling device 102 communicate wirelessly. In alternative embodiments, tunneling device 102 and controller 116 communicate in any manner that enables system 100 to operate as described herein. For example, in some embodiments, controller 116 and tunneling device 102 exchange information through a wired link extending between tunneling device 102 and controller 116.

In addition, in some embodiments, controller 116 is at least partly located on board tunneling device 102 and is configured to execute instructions for controlling components of tunneling device 102, such as a maintenance device and drive systems. For example, controller 116 executes instructions that cause tunneling device 102 to move in a selected direction. In alternative embodiments, tunneling device 102 includes any controller that enables system 100 to operate as described herein. In some embodiments, controller 116 is not located on board tunneling device 102.

In some embodiments, tunneling device 102 includes one or more sensors and/or repair tools or pipe maintenance tools. For example, in some embodiments, tunneling device 102 includes a repair tool configured to repair interior surface 108, or an inspection tool configured to inspect a portion of the interior cavity 112.

Also, in the example embodiment, an operator interface 130 is configured to display information relating to the characteristics detected by tunneling device 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 108 based on received signals. In some embodiments, operator interface 130 allows an operator to input and/or view information relating to control of tunneling device 102. In the example embodiment, operator interface 130 is configured to display information relating to the state of one or more of a maintenance device and a power source for interpretation by the operator. For example, state information may include a position of tunneling device 102 along a length of tunnel 104 (shown in FIG. 1). State information may also include a charge status of a power source and/or a current draw for the various drive and positioning motors. In various embodiments, processor 126 translates operator inputs into steering, tool motion, camera control, sensor control, sensor motion, and/or any other commands and sends information via transceiver 124 to tunneling device 102 via a transceiver of tunneling device 102. In some embodiments, operator control of tunneling device 102 is in real time, such as through a joystick, a keyboard, a touch-screen, a remote motion capture system, and/or a wearable motion capture system or other interface having similar function. In other embodiments, tunneling device 102 is controlled partially or wholly according to a pre-programmed routine. In further embodiments, tunneling device 102 is at least partially automated. In some embodiments, an operator inputs information such as operation goals or conditional directions. In further embodiments, information, such as information received by controller 116 from tunneling device 102, control data sent to tunneling device 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of tunnel 104 and communicates with tunneling device 102 positioned within interior cavity 112 of tunnel 104. For example, controller 116 is configured to send information to tunneling device 102 relating to the propulsion and/or steering of tunneling device 102 while tunneling device 102 is moving within interior cavity 112 of tunnel 104 through a wireless connection and/or a tether 132. In alternative embodiments, controller 116 and tunneling device 102 are configured in any manner that enables system 100 to operate as described herein.

Tunneling device 102 includes a body assembly 134, an expander 136 coupled to body assembly 134, and a tip 138 coupled to expander 136. Body assembly 134 of tunneling device 102 has a longitudinal axis 140. Body assembly 134 includes a plurality of sections 142 that extend along longitudinal axis 140. Sections 142 of body assembly 134 are modular and are detachably coupled together. Sections 142 of body assembly 134 are configured to move body assembly 134 through underground locations. For example, sections 142 of body assembly 134 selectively expand and contract (e.g., widths and/or lengths of sections 142 selectively increase and/or decrease) to propel body assembly 134 through tunnel 104. For example, each section 142 of body assembly 134 is configured to switch from a first configuration having a first length and/or a first width to a second configuration having a second length and/or a second width. The length and width of each section 142 of body assembly 134 may be switched independently and/or in unison when section 142 switches configuration. For example, in some embodiments, only the width of each section 142 of body assembly 134 changes when section 142 switches configurations. In other embodiments, only the length of each section 142 of body assembly 134 changes when section 142 switches configurations. In further embodiments, both the width and length of each section 142 of body assembly may be changed when section 142 switches configurations.

For example, sections 142 may each include pneumatic artificial muscles having elastomeric tubular membranes with fiber reinforcements and radial and axial actuators. The pneumatic artificial muscles operate based on instructions from controller 116 to cooperatively propel body assembly 134 in desired directions. As a result, sections 142 of body assembly 134 are designed to provide an axial force and a radial force that propel body assembly 134 and tether 132 through underground locations. In the example embodiment, body assembly 134 and tether 132 do not require a separate linear actuator for propulsion. In some embodiments, body assembly 134 includes at least three sections 142 (e.g., a first section, a second section, and a third section) that are configured to cooperate and provide a crawling action to propel body assembly 134 through tunnel 104. In alternative embodiments, tunneling device 102 includes any body assembly 134 that enables tunneling device 102 to operate as described herein.

Also, in the example embodiment, body assembly 134 includes a force transmitter 148 coupled to and extending between section 142 and expander 136. Force transmitter 148 is configured to deliver a force through expander 136 to tip 138 to move tip 138 in a direction parallel to longitudinal axis 140. For example, a shaft 150 is coupled to and extends between force transmitter 148 and tip 138. Shaft 150 extends through a bore 152 defined in expander 136. Force transmitter 148 is configured to cause shaft 150 and tip 138 to move relative to expander 136 in the direction parallel to longitudinal axis 140 and/or in a rotational direction about longitudinal axis 140.

Tip 138 is coupled to expander 136 by shaft 150. In the example embodiment, tip 138 is not directly attached to expander 136 and is free to move in at least one direction relative to expander 136. In the example embodiment, tip 138 is configured to move relative to expander 136 in a direction parallel to longitudinal axis 140. Tip 138 is shaped to engage material and displace material when force transmitter 148 causes shaft 150 and tip 138 to move relative to expander 136. For example, tip 138 includes a tunnelling tool configured to displace material as tip 138 moves. In the example embodiment, tip 138 is a cone having a width 164 and tapering to a point that is configured to engage the material. In alternative embodiments, tip 138 is any shape that enables tunneling device 102 to operate as described herein. For example, in some embodiments, tip 138 includes a blade, a helix, a sphere, and/or any other suitable shape.

In some embodiments, tip 138 includes at least one of a sensor and/or a repair tool, and tip 138 is configured to perform a maintenance operation within tunnel 104. For example, in some embodiments, tip 138 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, a maintenance device on tip 138 is used to provide information for steering tunneling device 102 and/or to perform a maintenance operation. In alternative embodiments, tunneling device 102 includes any tip 138 that enables tunneling device 102 to operate as described herein.

In addition, in some embodiments, tunneling device 102 includes a light source (not shown) configured to irradiate at least a portion of interior cavity 112 to facilitate visual or non-visual steering of tunneling device 102 and/or to allow a maintenance device to capture images, for example. The light source may be coupled to body assembly 134 and, in some embodiments, may be positionable relative to body assembly 134. In alternative embodiments, tunneling device 102 includes any light source that enables tunneling device 102 to operate as described herein.

Expander 136 is coupled to body assembly 134 and extends along longitudinal axis 140. Expander 136 is expandable in a direction perpendicular to longitudinal axis 140 between a first configuration having a first width 154 (shown in FIG. 2) measured perpendicular to longitudinal axis 140 and a second configuration having a second width 156 (shown in FIG. 3) measured perpendicular to longitudinal axis 140. Expander 136 is configured to facilitate force transmitter 148 inducing movement of tip 138 when expander 136 is in the second configuration. In addition, expander 136 is configured to engage a sidewall 106 of tunnel 104 and resist radial movement of tip when expander 136 is in the second configuration.

In the example embodiment, expander 136 includes a bladder 158 comprising an elastomeric material that is configured to expand/collapse when pressurized fluid is delivered/removed from bladder 158. In addition in the example embodiment, reinforcement muscles (e.g., fibers) extend around bladder 158 and are connected to radial and axial actuators. In the example embodiment, the muscles are reinforced with a fiber mesh pattern that constrains the direction and amount of expansion of bladder 158 based on a fiber reinforcement angle determined by the design of the muscle. For example, the fiber reinforcement may form a first arrangement (e.g., a tight mesh grid around the circumference of bladder) that allows bladder 158 to expand in an axial direction but not in a radial direction when bladder 158 is pressurized. Conversely, the fiber reinforcement may form a second arrangement (e.g., a looser mesh grid around the circumference of bladder 158 allowing radial expansion or stretching of the mesh) that allows bladder 158 to expand in the radial direction but not the axial direction when bladder 158 is pressurized. In addition, the fiber reinforcement angle is designed to arrest the deformation of bladder 158 at a pre-defined setpoint in the radial and/or axial direction when bladder 158 is pressurized. In the example embodiment, the fiber reinforcement angle of the muscles is between 10 degrees and 50 degrees with respect to the circumferential axis of the bladder. In alternative embodiments, tunneling device 102 includes any expander 136 that enables tunneling device 102 to operate as described herein.

In addition, in the example embodiment, pressurized fluid source 120 is coupled to one or more components of tunneling device 102 via fluid line 122. For example, pressurized fluid source 120 is coupled to bladder 158 of expander 136 via fluid line 122 and to sections 142 of body assembly 134 via fluid line 122. Bladder 158 is configured to transition expander 136 from the first configuration to the second configuration when pressurized fluid is delivered to bladder 158 via fluid line 122, and to transition expander 136 from the second configuration to the first configuration when the pressurized fluid is removed from bladder 158 via fluid line 122. In addition, in the example embodiment, sections 142 of body assembly 134 are configured to selectively switch configurations and propel body assembly 134 when pressurized fluid is delivered to or removed from sections 142 via fluid line 122. In alternative embodiments, system 100 includes any pressurized fluid source 120 that enables system 100 to operate as described herein. For example, in some embodiments, pressurized fluid source 120 includes separate fluid tanks and/or pumps that are coupled to and configured to regulate pressurized fluid in bladder 158 and/or sections 142. In addition, in some embodiments, system 100 includes a plurality of fluid lines 122 coupled to body assembly 134 and/or expander 136.

FIG. 2 is a side view of a portion of tunneling device 102 illustrating expander 136 of tunneling device 102 in a first configuration. FIG. 3 is a side view of a portion of tunneling device 102 illustrating expander 136 of tunneling device 102 in a second configuration. Expander 136 extends along longitudinal axis 140 and has first width 154 measured perpendicular to longitudinal axis 140 in the first configuration and second width 156 measured perpendicular to longitudinal axis 140 in the second configuration. Tip 138 has width 164 measured perpendicular to longitudinal axis 140. First width 154 of expander 136 is equal to or less than width 164 of tip 138. Second width 156 of expander 136 is greater than width 164 of tip 138. Accordingly, in the first configuration, expander 136 is within the radial extents of tip 138 and fits in a first section of tunnel 104 (shown in FIG. 1) formed by tip 138 without engaging sidewalls 106 (shown in FIG. 1) of the first section of tunnel 104. In the second configuration, expander 136 extends beyond the radial extents of tip 138 and is configured to engage sidewalls 106 of the first section of tunnel 104. As a result, expander 136 in the second configuration can brace against sidewalls 106 of the first section of tunnel 104 and compact material in sidewalls 106 to expand tunnel 104. For example, expander 136 enlarges tunnel 104 (shown in FIG. 1) by displacing the material because the pressure provided by expander 136 exceeds a cavity expansion pressure of the medium surrounding tunneling device 102. In the example embodiment, sections 142 of body assembly 134 are configured to further expand tunnel 104 in sections of tunnel 104 after tip 138, expander 136, and force transmitter 148 have moved through the section of tunnel 104. In addition, expander 136 braces body assembly 134 and/or tip 138 during movement of body assembly 134 and/or tip 138. In alternative embodiments, expander 136 has any configuration that enables tunneling device 102 to operate as described herein. For example, in some embodiments, expander 136 has a third configuration different from the first and second configurations. In further embodiments, expander 136 includes a graduated adjustment between the first and second configurations. In further embodiments, expander 136 changes its length when expander 136 transitions between the first and second configurations.

In addition, in the example embodiment of FIG. 2, force transmitter 148 includes a housing 166 and an actuator 168. In the example embodiment, housing 166 is cylindrical and extends along longitudinal axis 140. Actuator 168 is disposed within housing 166 and is configured to induce movement of shaft 150 based on instructions from controller 116 and/or when force transmitter 148 receives power from a power source. For example, force transmitter 148 is configured to move shaft 150 and tip 138 in a direction parallel to longitudinal axis 140 and/or rotate tip 138 about longitudinal axis 140. In alternative embodiments, tunneling device 102 includes any force transmitter 148 that enables tunneling device 102 to operate as described herein. For example, in some embodiments, force transmitter 148 includes a motor, a percussion hammer or reciprocating impact device, a linear actuator, a rotary actuator, and/or a pneumatic actuator.

Force transmitter 148 has a width 170 measured perpendicular to longitudinal axis 140. First width 154 of expander 136 is less than or equal to width 170 of force transmitter 148. Second width 156 of expander 136 is equal to or greater than width 170 of force transmitter 148. During operation, expander 136 transitions from the second configuration to the first configuration to facilitate body assembly 134 traveling through tunnel 104 (shown in FIG. 1). Force transmitter 148 of body assembly 134 is sized and shaped to follow behind expander 136 and fit within the tunnel that accommodates expander 136 because width 170 of force transmitter 148 is less than or equal to second width 156 of expander 136.

Referring to FIGS. 1-3, during operation, tunneling device 102 is positioned proximate surface 114 such that distal tip 138 engages material of the surface 114. Controller 116 provides instructions that cause tunneling device 102 to tunnel into surface 114 and through underground locations. For example, pressurized fluid is supplied to expander 136 to transition expander 136 to the second configuration. In the second configuration, expander 136 braces tip 138 and facilitates force transmitter 148 moving tip 138. For example, expander 136 engages sidewalls 106 of tunnel 104 and resists radial movement of tip 138. Power is delivered to force transmitter 148 and force transmitter 148 transfers force to tip 138 through expander 136 while in the second configuration to cause tip 138 to move and, thereby, displace material.

Tip 138 displaces material to form interior cavity 112 when tip 138 is moved by force transmitter 148. For example, tip 138 displaces the material in directions parallel and/or perpendicular to longitudinal axis 140. In the example embodiment, the cone shape of tip 138 causes material in front of tunneling device 102 to be compacted and directed at least partly in a direction perpendicular to longitudinal axis 140. Width 164 of tip 138 defines an initial width of interior cavity 112 of tunnel 104 as tip 138 displaces material. In the example embodiment, system 100 does not require an apparatus to remove at least some of the displaced material because tunneling device 102 compacts the displaced material around tunnel 104. Also, in the example embodiment, body assembly 134 is in a stationary position and expander 136 braces tip 138 as tip 138 displaces material.

After tip 138 has displaced material, expander 136 is transitioned back to the first configuration. For example, pressurized fluid is removed from expander 136 to transition expander 136 back to the first configuration. Body assembly 134 propels tunneling device 102 through tunnel 104 with expander 136 in the first configuration. For example, sections 142 of body assembly 134 are selectively switched between first and second configurations to propel body assembly 134 forward. Tip 138 engages new material to be displaced as body assembly 134 is propelled forward.

As tip 138 engages new material, pressurized fluid is supplied to expander 136 to transition expander 136 to the second configuration. As expander 136 transitions to the second configuration, expander 136 engages sidewall 106 and compresses material previously displaced by tip 138 and, in some embodiments, expands interior cavity 112. In the second configuration, expander 136 braces tunneling device 102 against radial displacement and focuses the force from force transmitter 148 on tip 138. Power is delivered to force transmitter 148 and force transmitter 148 delivers force to tip 138 through expander 136 in the second configuration to cause tip 138 to move relative to the material and, thereby, displace material. After tip 138 displaces material, expander 136 is transitioned back to the first configuration again and body assembly 134 propels tunneling device 102 through tunnel 104 with expander 136 in the first configuration. Tunneling device 102 iteratively displaces material and propels through underground locations to provide a desired length of tunnel 104.

Controller 116 provides instructions to direct tunneling device 102 through underground locations. For example, controller 116 may generate instructions to cause tunneling device 102 to travel in a straight direction and/or to turn as body assembly 134 propels tunneling device 102. For example, controller 116 may send instructions that cause muscles in sections 142 of body assembly 134 to adjust and bend as sections 142 are selectively switched between configurations.

In addition, controller 116 may provide instructions that determine the amount of force that force transmitter 148 delivers to tip 138. For example, controller 116 may determine the amount of force to deliver to tip 138 based on the type of material around tip 138, the characteristics of tip 138, the direction and magnitude of travel desired, and/or any other operative parameters of tunneling device 102. In the example embodiment, the amount of force required from force transmitter 148 to induce movement of tip 138 is reduced because of the configuration of expander 136. For example, expander 136 braces tip 138 and facilitates force transmitter 148 efficiently delivering force to tip 138. As a result, tunneling device 102 has reduced power requirements compared to other devices.

Figure 4:
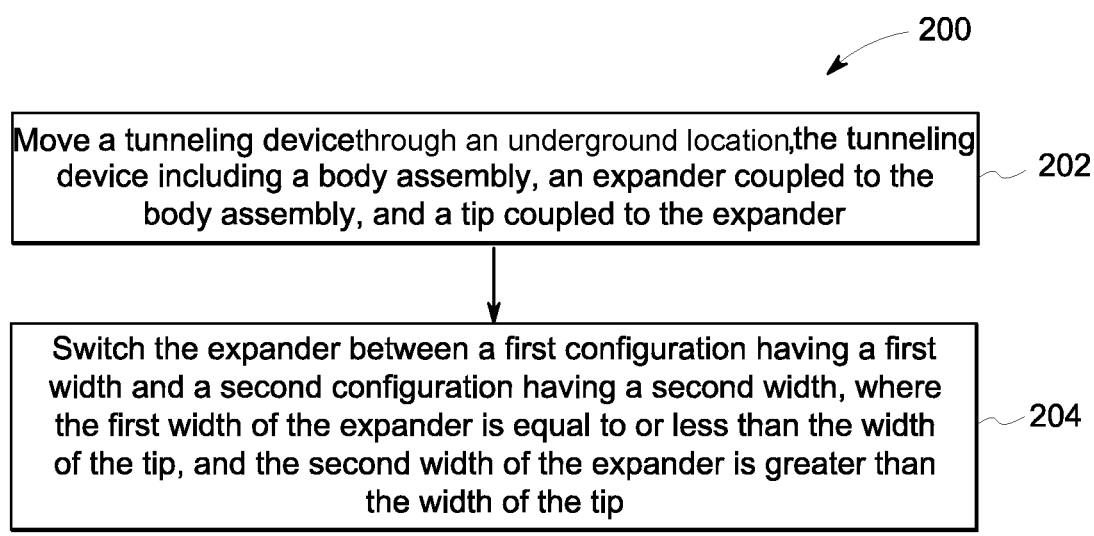
FIG. 4 is a flow chart of an example method of performing a maintenance operation using the tunneling device shown in FIG. 1.

FIG. 4 is a flow chart of an example method 200 of maintaining tunnel 104 (shown in FIG. 1) using tunneling device 102 (shown in FIG. 1). In reference to FIGS. 1-4, method 200 includes moving 202 tunneling device 102 through and underground location. In some embodiments, tunneling device 102 is propelled through underground locations using the plurality of sections 142 of body assembly 134. For example, pressurized fluid from pressurized fluid source 120 is delivered to or removed from sections 142 of body assembly 134 to sequentially adjust a length and/or a width of sections 142 and propel body assembly 134 through the underground locations.

In addition, method 200 includes switching 204 expander 136 between the first configuration and the second configuration. For example, pressurized fluid source 120 delivers pressurized fluid from expander 136 to switch expander 136 from the first configuration to the second configuration or removes pressurized fluid from expander 136 to switch expander 136 from the second configuration to the first configuration. Expander 136 is configured to fit into tunnel 104 formed by tip 138 and travel through interior cavity 112 when expander 136 is in the first configuration and body assembly 134 propels body assembly 134 through interior cavity 112. Expander 136 is configured to engage sidewall 106 of tunnel 104 and resist radial movement of tip 138 when expander 136 is in the second configuration. In addition, expander 136 facilitates force transmitter 148 delivering a force through expander 136 to tip 138 when expander 136 is in the second configuration. When tip 138 receives the force from force transmitter 148, tip 138 moves relative to expander 136 and body assembly 134 to displace material and form tunnel 104.

In the example embodiment, any steps of method 200 are repeated any number of times required for tunneling device 102 to travel a desired distance through tunnel 104 and/or to displace material and form a desired length of tunnel 104.

Figure 5:
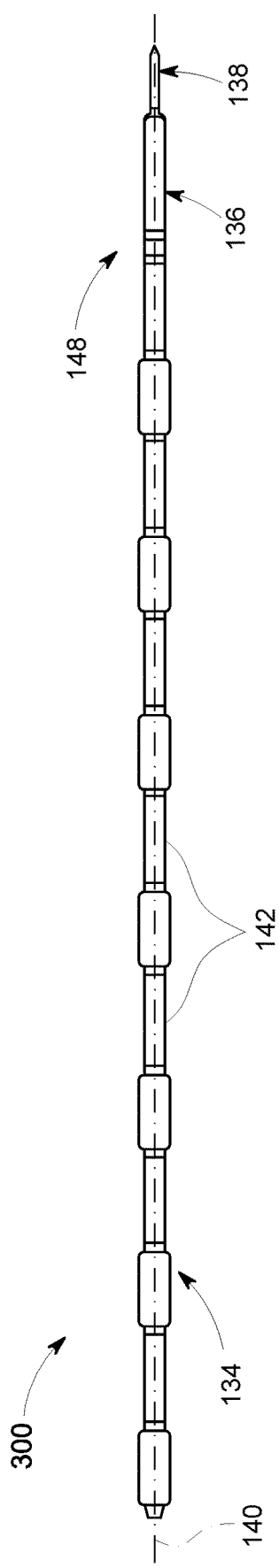
FIG. 5 is a side view of an alternative embodiment of a tunneling device for use with the system shown in FIG. 1, the tunneling device having a distal end including a cone.

FIG. 5 is a side view of an alternative embodiment of a tunneling device 300 for use with system 100 (shown in FIG. 1). Tunneling device 300 is similar to tunneling device 102 (shown in FIG. 1) except as described and shown. Tunneling device 300 includes a body assembly 134, an expander 136 coupled to body assembly 134, and a tip 138 coupled to expander 136. Body assembly 134 of tunneling device 300 includes a plurality of sections 142 that extend along a longitudinal axis 140. Sections 142 of body assembly 134 are modular and are detachably coupled together. In the illustrated embodiment, body assembly 134 includes seven sections 142 that are configured to cooperate and provide a crawling action to propel body assembly 134 through underground locations although greater of fewer such sections 142 may be used. In alternative embodiments, tunneling device 300 includes any body assembly 134 that enables tunneling device 300 to operate as described herein.

Figure 6:
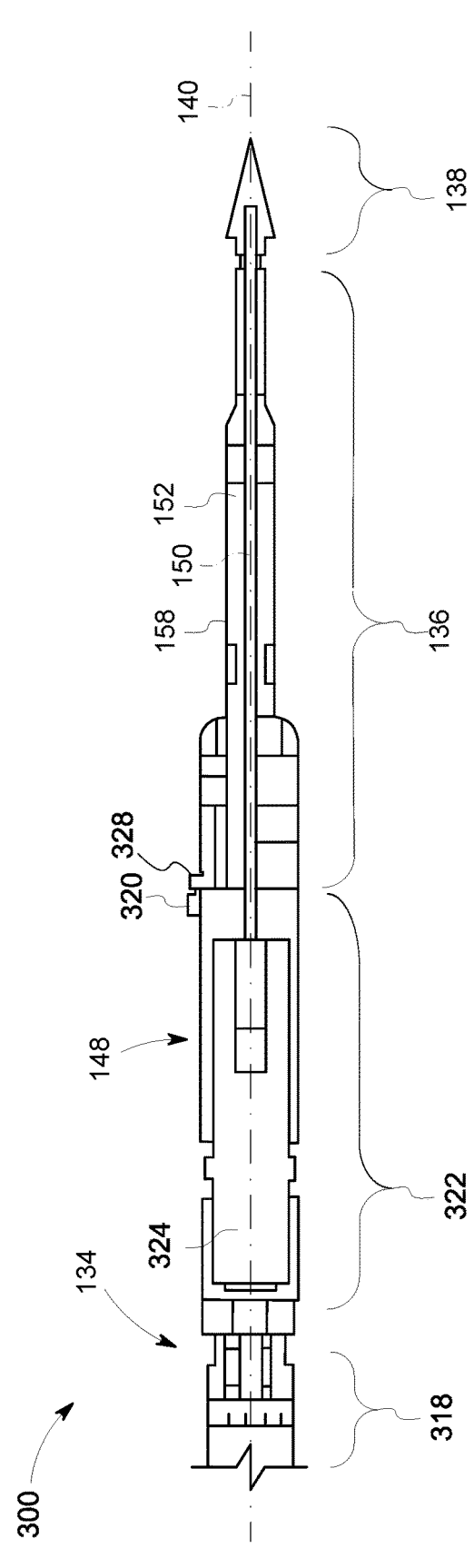
FIG. 6 is an enlarged view of a portion of the tunneling device of FIG. 5.

FIG. 6 is an enlarged view of a portion of tunneling device 300. In the example embodiment, tip 138 is shaped to engage material as tunneling device 300 travels through underground locations. In the example embodiment, tip 138 is a cone having a maximum width at its base and narrowing to a point. In alternative embodiments, tip 138 is any shape that enables tunneling device 300 to operate as described herein. For example, in some embodiments, tip 138 includes a blade, a helix, sphere, and/or any other suitable shape.

Also, in the example embodiment, body assembly 134 includes force transmitter 148 coupled to and extending between sections 142 (shown in FIG. 5) and expander 136. Force transmitter 148 is configured to deliver a force through expander 136 to tip 138 to move tip 138 in a direction parallel to longitudinal axis 140. For example, a shaft 150 is coupled to force transmitter 148 and tip 138. Shaft 150 extends through a bore 152 defined in expander 136. Force transmitter 148 is configured to cause shaft 150 to move relative to expander 136 in the direction parallel to longitudinal axis 140 to transmit force to tip 138 and cause tip 138 to move.

As shown in the illustrated embodiment of FIG. 6, force transmitter 148 includes a first end coupling 318, a second end coupling 320, a housing 322 extending between first end coupling 318 and second end coupling 320, and an actuator 324 disposed at least partly within housing 322. First end coupling 318 is configured to couple to section 142 of body assembly 134. Second end coupling 320 is configured to couple to expander 136. Actuator 324 is coupled to shaft 150 and is configured to provide a force to displace shaft 150 in a direction parallel to longitudinal axis 140. For example, actuator 324 includes a percussion hammer or reciprocating impact device. In alternative embodiments, tunneling device 300 includes any force transmitter 148 that enables tunneling device 300 to operate as described herein.

Expander 136 is coupled to body assembly 134 and extends along longitudinal axis 140. In particular, expander 136 is coupled to second end coupling 320 of force transmitter 148. Expander 136 is configured to switch between a first configuration (shown in FIGS. 5 and 6) and a second configuration (not shown in FIGS. 5 and 6) and facilitate force transmitter 148 delivering a force to tip 138. In addition, expander 136 braces tip 138 against radial displacement when expander 136 is in the second configuration. In the example embodiment, shaft 150 extends beyond expander 136 and is coupled to tip 138. In the example embodiment, tip 138 is not attached directly to expander 136 and is free to move relative to expander 136 in a direction parallel to longitudinal axis 140.

Also, in the example embodiment, expander 136 includes bladder 158 and a coupling 328. Coupling 328 is configured to engage and couple to second end coupling 320 of force transmitter 148. Coupling 328 fixes the position of expander 136 longitudinally relative to force transmitter 148. Bladder 158 is constructed of an elastomeric material and is configured to expand when pressurized fluid is delivered to bladder 158 and contract when pressurized fluid is removed from bladder 158. Bladder 158 expands or contracts to transition between the first and second configurations. In the example embodiment, coupling 328 and bladder 158 at least partly define bore 152. In some embodiments, expander 136 includes a bearing, seal, and/or support that is configured to engage and support shaft 150 and facilitate movement of shaft 150 relative to expander 136. In alternative embodiments, tunneling device 300 includes any expander 136 that enables tunneling device 300 to operate as described herein.

FIG. 7 is a side view of an alternative embodiment of a tunneling device 400 for use with system 100 (shown in FIG. 1). Tunneling device 400 is similar to tunneling device 102 (shown in FIG. 1) and tunneling device 300 (shown in FIG. 5) except tunneling device 400 is configured to form a tunnel in a different manner than tunneling device 102 and tunneling device 300. For example, tunneling device 400 includes an expander 404, a force transmitter 412, and a tip 406 that are configured to facilitate an auger-style digging action. In the example embodiment, tunneling device 400 includes body assembly 134, expander 404 coupled to body assembly 134, and tip 406 coupled to expander 404. Body assembly 134 of tunneling device 400 includes a plurality of sections 142 that extend along a longitudinal axis 140. Sections 142 of body assembly 134 are modular and are detachably coupled together. In the example embodiment, body assembly 134 includes at least seven sections 142 that are configured to cooperate and provide a crawling action to propel body assembly 134 through underground locations. In alternative embodiments, tunneling device 400 includes any body assembly 134 that enables tunneling device 400 to operate as described herein.

Also, in the example embodiment, body assembly 134 includes force transmitter 412 coupled to and extending between sections 142 and expander 404. Force transmitter 412 is configured to deliver a force through expander 404 to tip 406 to rotate tip 406 in a direction about longitudinal axis 140.

FIG. 8 is an enlarged view of a portion of tunneling device 400. A shaft 414 is coupled to force transmitter 412 (shown in FIG. 7) and tip 406. Shaft 414 extends through a bore 416 defined in expander 404. Force transmitter 412 is configured to cause shaft 414 to rotate relative to expander 404 and about longitudinal axis 140. Tip 406 is coupled to shaft 414 and rotates with shaft 414 when force transmitter 412 induces rotation of shaft 414. In addition, force transmitter 412 is configured to cause shaft 414 and tip 406 to move in a direction parallel to longitudinal axis 140. For example, force transmitter 412 may include linear and/or rotary actuators.

In the example embodiment, tip 406 is shaped to engage material and displace material as tip 406 rotates and moves in a direction parallel to longitudinal axis 140. In the example embodiment, tip 406 is an auger that includes one or more blade edges and has a helical shape. The outer extents of the auger define a width of tip 406. In alternative embodiments, tip 406 is any shape that enables tunneling device 400 to operate as described herein. For example, in some embodiments, tip 406 includes a blade, a helix, sphere, and/or any other suitable shape.

In the example embodiment, expander 404 is coupled to body assembly 134 (shown in FIG. 7) and extends along longitudinal axis 140. Expander 404 includes a first end coupling 418, a second end coupling 420, a bladder 422, and a support 424. First end coupling 418 is configured to engage and couple to force transmitter 148. Second end coupling 420 is coupled to tip 406. A fluid supply line 426 extends through first end coupling 418 and connects to bladder 422. Bladder 422 is constructed of an elastomeric material and is configured to expand when pressurized fluid is delivered to bladder 422 and contract when pressurized fluid is removed from bladder 422 via fluid supply line 426. Bladder 422 expands or contracts to transition between a first configuration and a second configuration.

In the example embodiment, support 424 of expander 404 extends along longitudinal axis 140 through the length of bladder 422 and defines bore 416. Support 424 is configured to engage and support shaft 414 and facilitate movement of shaft 414 relative to expander 404. For example, bore 416 receives and support shaft 414 such that is movable relative to support 424 along and about longitudinal axis 140 but shaft 414 is braced against movement in a direction perpendicular to longitudinal axis 140. In addition, bladder 422 is movably coupled to support 424. For example, one end of bladder 422 is coupled to support 424 by a sliding seal 428 that facilitates bladder 422 moving in a direction parallel to longitudinal axis 140 when expander 404 transitions between the first and second configurations. In alternative embodiments, tunneling device 400 includes any expander 404 that enables tunneling device 400 to operate as described herein.

An example technical effect of the methods, systems, and apparatus described herein includes at least one of: (a) reducing the time to construct tunnels through underground locations; (b) enabling tunneling operations and/or inspection and repair of an interior cavity of a tunnel at greater distances from an access opening; (c) increasing the information that is available during tunneling operations; (d) reducing the power requirements for tunneling devices during tunneling operations; (e) increasing the strength and robustness of tunnel constructions; and (f) reducing apparatus required to remove displaced material from tunnels during construction.

Example embodiments of systems and methods for use in tunneling operations are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with tunnels as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tunneling device comprising:
   a body assembly;
   an expander coupled to said body assembly and extending along a longitudinal axis, wherein said expander is expandable in a direction perpendicular to the longitudinal axis between a first configuration having a first width measured perpendicular to the longitudinal axis and a second configuration having a second width measured perpendicular to the longitudinal axis;
   a tip coupled to said expander, wherein said tip has a width measured perpendicular to the longitudinal axis, and wherein the first width of said expander is equal to or less than the width of said tip; and
   a force transmitter coupled to said expander, wherein said expander is disposed between said force transmitter and said tip, and wherein said force transmitter is configured to deliver a force through said expander to said tip to move said tip in a direction parallel to the longitudinal axis with said expander in the second configuration, wherein said force transmitter has a width measured perpendicular to the longitudinal axis, and wherein the second width of said expander is equal to or greater than the width of said force transmitter.

2. The tunneling device in accordance with claim 1 further comprising a shaft coupled to said force transmitter and extending through a bore defined in said expander, wherein said shaft is configured to move relative to said expander in the direction parallel to the longitudinal axis.

3. The tunneling device in accordance with claim 1, wherein the second width of said expander is greater than the width of said tip.

4. The tunneling device in accordance with claim 3, wherein the first width of said expander is less than the width of said force transmitter.

5. The tunneling device in accordance with claim 1, wherein said tip comprises a tunnelling tool configured to displace material and form a tunnel as said tip moves, wherein said expander is configured to fit into the tunnel formed by said tip when said expander is in the first configuration, and wherein said expander is configured to engage a sidewall of the tunnel and resist radial movement of said tip when said expander is in the second configuration.

6. The tunneling device in accordance with claim 1, wherein said tip comprises at least one of a sensor and/or a repair tool, and wherein said tip is configured to perform a maintenance operation within a tunnel.

7. The tunneling device in accordance with claim 6, further comprising a pressurized fluid source and a fluid line coupled between said expander and said pressurized fluid source, wherein said expander comprises a bladder configured to transition said expander from the first configuration to the second configuration when pressurized fluid is delivered to said bladder via said fluid line, and transition said expander from the second configuration to the first configuration when the pressurized fluid is removed from said bladder.

8. The tunneling device in accordance with claim 1, wherein said body assembly comprises:
 a first section; and
 a second section coupled to said first section, wherein said first section and said second section are configured to move said body assembly through an underground location.

9. The tunneling device in accordance with claim 8, wherein said first section and said second section of said body assembly are coupled to a fluid line, and wherein said first section and said second section are configured to selectively adjust their size and move said body assembly when a pressurized fluid is delivered to or removed from said first section and said second section through said fluid line.

10. The tunneling device in accordance with claim 9, wherein said first section of said body assembly is configured to switch from a first configuration having a first length and a first width to a second configuration having a second length and a second width, and wherein said second section of said body assembly is configured to switch from a third configuration having a third length and a third width to a fourth configuration having a fourth length and a fourth width.

11. The tunneling device in accordance with claim 1, wherein said force transmitter comprises a housing and an actuator disposed within the housing, wherein said force transmitter is configured to deliver a force through said expander to said tip to move said tip in a direction parallel to the longitudinal axis when power is delivered to said actuator, and wherein said actuator comprises a reciprocating impact device.

12. A system for use in maintaining a tunnel, said system comprising:
 a tunneling device comprising:
  a body assembly comprising a force transmitter;
  an expander coupled to said body assembly and extending along a longitudinal axis, wherein said expander is expandable in a direction perpendicular to the longitudinal axis between a first configuration having a first width measured perpendicular to the longitudinal axis and a second configuration having a second width measured perpendicular to the longitudinal axis; and
  a tip coupled to said expander and configured to move relative to said expander, wherein said expander is disposed between said force transmitter and said tip, wherein said tip has a width measured perpendicular to the longitudinal axis, and wherein the first width of said expander is equal to or less than the width of said tip; and
 a controller communicatively coupled to said tunneling device, said controller configured to provide instructions to move said body assembly.

13. The system in accordance with claim 12, wherein said controller is configured to send instructions to said force transmitter to cause said force transmitter to deliver a force through said expander to said tip to move said tip in a direction parallel to the longitudinal axis, wherein said force transmitter has a width measured perpendicular to the longitudinal axis, and wherein the second width of said expander is equal to or greater than the width of said force transmitter.

14. The system in accordance with claim 12 further comprising a pressurized fluid source and a fluid line coupled to said pressurized fluid source and to said expander, wherein said expander comprises a bladder configured to transition said expander from the first configuration to the second configuration when pressurized fluid is delivered to the bladder via the fluid line, and transition said expander from the second configuration to the first configuration when the pressurized fluid is removed from said bladder via the fluid line, wherein said bladder is constrained by reinforcement fibers having a reinforcement angle that is selected to arrest deformation of said bladder at a predefined setpoint.

15. The system in accordance with claim 14, wherein said body assembly comprises a first section and a second section coupled to said second first section, and wherein said first section and said second section are configured to selectively adjust their size and move said body assembly when the pressurized fluid is delivered to or removed from said first section and said second section via said fluid line.

16. The system in accordance with claim 12, wherein said controller is located on board said tunneling device.

17. A method for maintaining a tunnel having a sidewall defining an interior cavity, said method comprising:
 moving a tunneling device through an underground location, the tunneling device including:
  a body assembly including a plurality of sections and a force transmitter;
  an expander coupled to the body assembly and extending along a longitudinal axis, wherein the expander is expandable in a direction perpendicular to the longitudinal axis between a first configuration having a first width measured perpendicular to the longitudinal axis and a second configuration having a second width measured perpendicular to the longitudinal axis; and a tip coupled to the expander and configured to move relative to the expander, wherein the expander is disposed between the force transmitter and the tip, wherein the tip has a width measured perpendicular to the longitudinal axis, and wherein the first width of the expander is equal to or less than the width of the tip; and switching the expander between the first configuration and the second configuration.

18. The method in accordance with claim 17, further comprising delivering, using the force transmitter coupled to the expander, a force through the expander to the tip to move the tip in a direction parallel to the longitudinal axis.

19. The method in accordance with claim 18, further comprising displacing material to form the tunnel as said the tip moves, wherein the expander is configured to fit into the tunnel formed by the tip when the expander is in the first configuration, and wherein the expander is configured to engage the sidewall of the tunnel and resist radial movement of the tip when the expander is in the second configuration.

20. The method in accordance with claim 17, wherein switching the expander between the first configuration and the second configuration comprises delivering pressurized fluid to the expander to switch the expander from the first configuration to the second configuration or removing pressurized fluid from the expander to switch the expander from the second configuration to the first configuration.

21. The method in accordance with claim 17, wherein moving the tunneling device through the underground location comprises sequentially adjusting a length and a width of each section of the plurality of sections of the body assembly.

* * * * *